(12) United States Patent
Smolders et al.

(10) Patent No.: US 7,460,122 B1
(45) Date of Patent: Dec. 2, 2008

(54) METHOD FOR GRAPHICAL DISPLAY OF CPU UTILIZATION

(75) Inventors: Luc R. Smolders, Rochester, MN (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/035,800

(22) Filed: Feb. 22, 2008

(51) Int. Cl. *G06T 11/20* (2006.01)

(52) U.S. Cl. ...................................... 345/440

(58) Field of Classification Search ................. 345/440, 345/589
See application file for complete search history.

(56) References Cited

U.S. PATENT DOCUMENTS

| | | | | |
|---|---|---|---|---|
| 5,442,741 A | * | 8/1995 | Hughes et al. | 345/442 |
| 6,041,041 A | * | 3/2000 | Ramanathan et al. | 370/241 |
| 6,320,586 B1 | * | 11/2001 | Plattner et al. | 715/700 |
| 6,880,086 B2 | * | 4/2005 | Kidder et al. | 713/191 |
| 7,268,782 B2 | * | 9/2007 | Ebert | 345/440 |
| 2004/0267548 A1 | | 12/2004 | Jones | |
| 2006/0179431 A1 | | 8/2006 | Devanathan et al. | |

OTHER PUBLICATIONS

Doherty, S., "HP Open View in illuminating-and helping control-problems," Network Computing, Feb. 19, 2004.

\* cited by examiner

*Primary Examiner*—Jeffery A. Brier
(74) *Attorney, Agent, or Firm*—Cahn & Samuels, LLP

(57) ABSTRACT

A method for graphically displaying central processing unit consumption for at least one variable capacity or uncapped partition including displaying CPU utilization or consumption of at least one variable capacity or uncapped partition in a variable-size colored pie chart. The pie chart shows time spent in at least one of user mode, operating system mode, I/O wait mode, or idle mode, with each mode being represented by a different color. An entitlement indicator is displayed for the effective minimum capacity of the at least one variable capacity or uncapped partition.

1 Claim, 1 Drawing Sheet

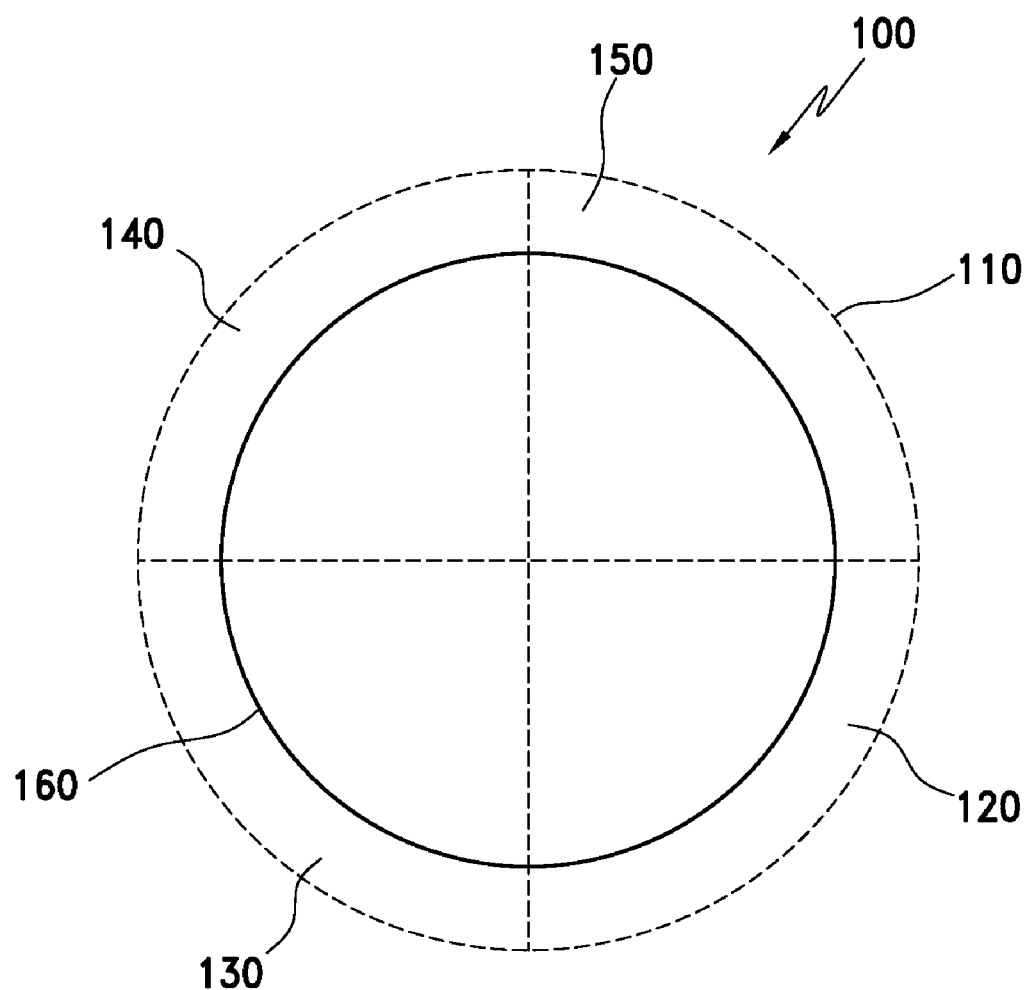
FIGURE

METHOD FOR GRAPHICAL DISPLAY OF CPU UTILIZATION

I. FIELD OF THE INVENTION

This invention relates to a method for graphically displaying central processing unit (CPU) utilization or consumption for variable capacity or uncapped partitions.

II. BACKGROUND OF THE INVENTION

When using variable capacity or uncapped partitions, analyzing CPU utilization becomes quite a challenge because the partitions can have a different effective capacity at each interval, depending on cycle availability in the shared pool and demand from the partitions.

Traditional ways to display CPU utilization or consumption consists of showing four percentages representing time spent in (1) user mode, (2) operating system mode, (3) I/O wait state, or (4) idle. However, displaying these four percentages does not provide enough information. For variably capacity partitions, these percentages are relative to a moving target (i.e., the effective capacity of the partition). Additional metrics need to be displayed, representing the real physical consumption in the interval, i.e. in real-time.

III. SUMMARY OF THE INVENTION

The exemplary embodiment illustrates a method for graphically displaying central processing unit utilization or consumption for at least one variable capacity or uncapped partition including displaying CPU utilization or consumption of at least one variable capacity or uncapped partition in a variable-size colored pie chart. The pie chart shows time spent in at least one of user mode, operating system mode, I/O wait mode, or idle mode, with each mode being represented by a different color. An entitlement indicator is displayed for the effective minimum capacity of the at least one variable capacity or uncapped partition.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the method should become evident to a person of ordinary skill in the art.

IV. BRIEF DESCRIPTION OF THE DRAWING

The sole FIGURE illustrates displaying a variable size pie chart to show CPU utilization or consumption of at least one variable capacity partition with an entitlement indicator displayed as a fixed circle according to the depicted embodiment.

V. DETAILED DESCRIPTION OF THE DRAWING

The FIGURE illustrates a method for graphically displaying CPU utilization or consumption for at least one variable capacity or uncapped partition. Variable capacity or uncapped partitions do not define free capacity, and the capacity of such partitions may fluctuate or grow based upon the use of other partitions.

As illustrated in the FIGURE, CPU consumption of at least one variable capacity or uncapped partition 100 may be graphically displayed using a variable size (i.e., variable diameter) colored pie chart 110. The pie chart 110 shows the time spent in at least one of a user mode 120, an operating system mode 130, idle mode 140, and an I/O wait mode 150 as percentages.

The pie chart 110 may show each of the modes in a different color or may use a single color to show two or more modes. In certain embodiments, a plurality of pie charts may be displayed, for example, side-by-side with each pie chart displaying a different variable capacity or uncapped partition.

According to the depicted embodiment, the pie chart 110 may be used to show CPU consumption of at least one variable or uncapped partition for a single user or across a specific group or system. In embodiments, the pie chart may be displayed in a system interface, for example, in a graphic user interface (GUI).

According to the depicted embodiment, an entitlement indicator 160 is used as a reference to show a minimum effective capacity for each variable capacity or uncapped partition. The entitlement indicator may be a fixed circle that overlaps the variable size pie chart. The variable size pie chart may expand above or below the entitlement indicator. In other embodiments, the entitlement indicator may be a bar next to the variable size pie chart.

The entitlement indicator 160 allows for a quick visual comparison of the current, real-time variable size pie chart, which fluctuates or grows with the actual CPU consumption of at least one uncapped partition, with the minimum effective capacity for the at least one uncapped partition.

By looking at the variable size pie chart and the entitlement indicator, it can be determined where CPU consumption is occurring (i.e., whether and to what extent CPU consumption is occurring in user mode, in the operating system, in I/O wait state, or in idle).

Although the FIGURE and discussion above are directed to CPU utilization or consumption of at least one variable capacity or uncapped partition, the present invention may also be used to show utilization or consumption of at least one capped partition. In fact, the variable size pie chart and entitlement indicator may be used for modeling any metric that changes or fluctuates with respect to a reference point in real-time.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of at least one general purpose computer, special purpose computer(s), or other programmable data processing apparatus to produce a machine, such that the instructions, which execute via the processor of the computer or other programmable data processing apparatus, create means for implementing the functions specified in the flowcharts or block diagrams.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

The invention claimed is:

1. A method for graphically displaying central processing unit utilization or consumption for at least one variable capacity or uncapped partition, comprising:
   displaying CPU utilization or consumption of at least one variable capacity or uncapped partition in a variable-size colored pie chart, wherein the pie chart shows time spent in at least one of user mode, operating system mode, I/O wait mode, or idle mode, each mode represented by a different color; and
   displaying an entitlement indicator for the effective minimum capacity of the at least one variable capacity or uncapped partition.

* * * * *